United States Patent [19]
Ketterling

[11] Patent Number: 5,333,150
[45] Date of Patent: Jul. 26, 1994

[54] DEMODULATION AND SYNCHRONIZATION METHOD AND SYSTEM FOR DIGITALLY MODULATED SIGNALS

[75] Inventor: Hans-Peter Ketterling, Berlin, Fed. Rep. of Germany

[73] Assignee: Robert Bosch GmbH, Stuttgart, Fed. Rep. of Germany

[21] Appl. No.: 887,359

[22] Filed: May 21, 1992

[30] Foreign Application Priority Data

May 22, 1991 [DE] Fed. Rep. of Germany ....... 4116614

[51] Int. Cl.$^5$ ........................................... H04L 27/22
[52] U.S. Cl. ..................................... 375/80; 375/82; 329/302; 329/321
[58] Field of Search ................................. 375/80-83, 375/88, 94, 106; 329/302, 304, 306, 307, 321, 323, 325

[56] References Cited

U.S. PATENT DOCUMENTS

| | | | |
|---|---|---|---|
| 4,227,175 | 10/1980 | Newman | 371/37.9 |
| 4,378,526 | 3/1983 | Champagne et al. | 375/82 |
| 4,486,716 | 12/1984 | Le Floch | 375/82 |
| 5,073,905 | 12/1991 | Dapper et al. | 375/106 |

FOREIGN PATENT DOCUMENTS

0230559A1 8/1987 European Pat. Off.
2549322 1/1985 France

OTHER PUBLICATIONS

B. W. Maples, et al, "Rapid Clock Recovery Technique with Monotonic Phase Error Metric", 1990, pp. 0141-0145, IEEE Military Communications Conference.

Primary Examiner—Stephen Chin
Assistant Examiner—Tse: Young
Attorney, Agent, or Firm—Frishauf, Holtz, Goodman & Woodward

[57] ABSTRACT

A digitally modulated signal of the FSK type is subjected to limiting and linear FM demodulation to produce a baseband signal which often fails to show clearly the serial binary digital signal because of distortion and disturbances prior to its reception. The amplitude of the base-band signal is digitally sampled (quantized) at a uniform sampling rate which is an integral multiple of the symbol rate of the base-band signal. A sequence of successive amplitude samples spanning at least a symbol period addresses, at twice the symbol rate a look-up table containing a set of stored signal patterns and correspondence of patterns within a predetermined degree of similarity is elicited at twice the symbol rate along with information on the degree of similarity, and also a synchronizing pulse when the amplitude pattern shows that a binary signal transition is detected at a particular part of the pattern of the amplitude sample sequence. The synchronizing signal goes to a phase locked loop for clocking the system, so that the clock phase will shift until it is locked so that the comparison results at twice the symbol rate will show transitions and logic levels in the comparison results. A second stage for a look-up table similarly addressed but clocked at the symbol rate and encompassing at least two consecutive symbol periods further assures a high degree of accuracy in reproducing the digital signal content of the base-band signal.

27 Claims, 7 Drawing Sheets

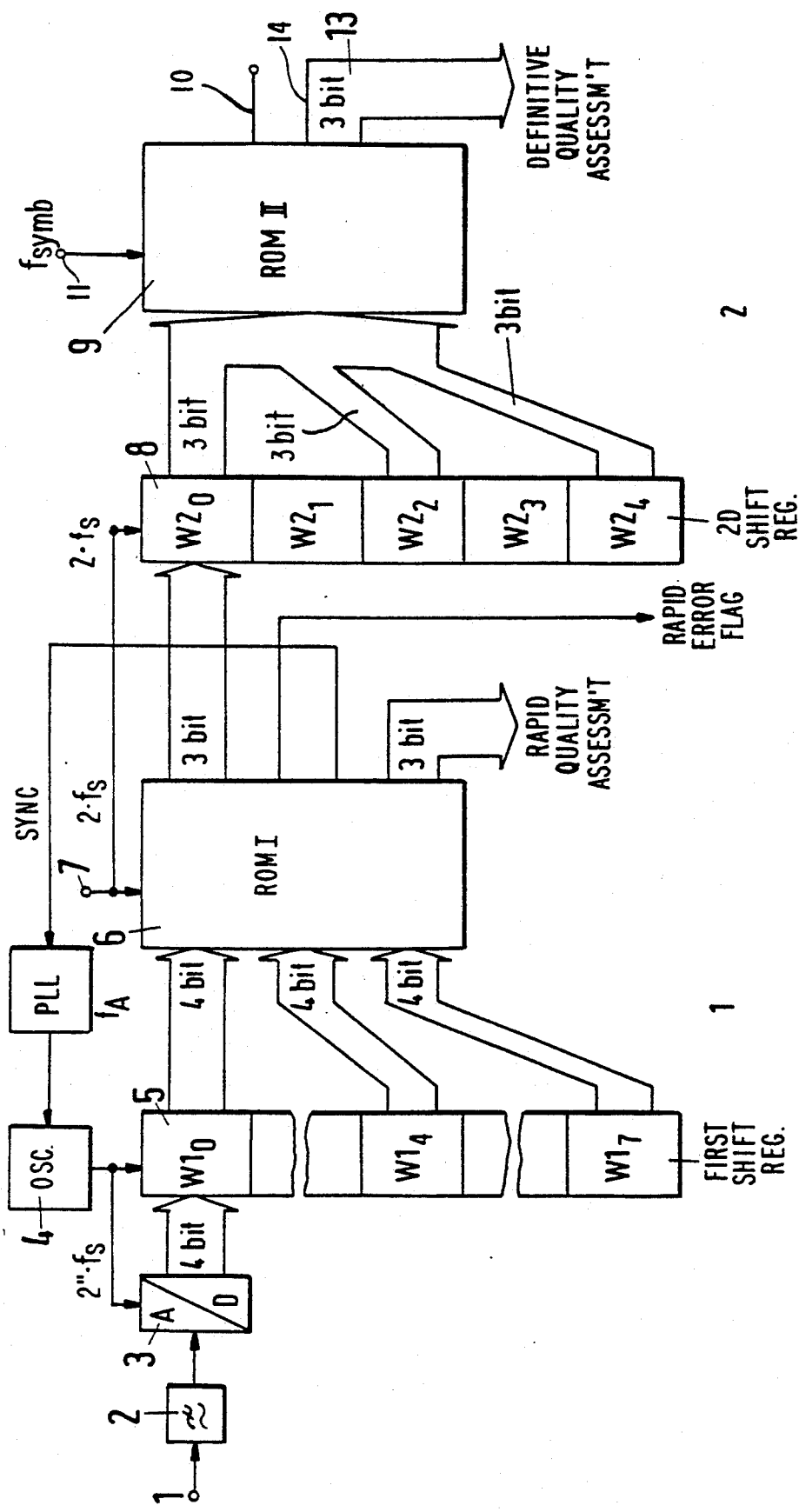

DEMODULATION AND SYNCHRONIZATION METHOD AND SYSTEM FOR DIGITALLY MODULATED SIGNALS

FIELD OF THE INVENTION

This invention is in the field of demodulating and synchronizing digital signals which are present in the form of modulated signals, a field which encompasses demodulation of the so-called CPM Method of demodulation and its several varieties and also the field of demodulation methods for angular (phase frequency) modulation performed in two or more stages with constant amplitude.

BACKGROUND AND PRIOR ART

A series of complicated and expensive demodulation and synchronization methods have been developed heretofore for use in mobile radio communication. The known methods operate with a great deal of complexity and the signal is processed for demodulation and/or synchronization with reference to discrete threshold values. In such cases disturbances creep directly into the demodulation result and can be mitigated only by expensive and troublesome transmission methods which increase the redundance of the signal. Furthermore, with these methods there is still a reduction of the transmissible data that can pass through any given information transmission channel.

SUMMARY OF THE INVENTION

It is an object of this invention to provide a demodulation and synchronization method and system for digitally modulated signals in which the above-mentioned complications, and especially logic circuits, software, etc. included therein, can be reduced, and to provide a solution which operates within wide limits in a reliable and undisturbed manner even in the case of a transmission channel that is subject to disturbances.

Briefly, after the usual limiting and an FM demodulation which is preferably of the linear type, a base-band signal is obtained which is then quantized in its amplitude in a time grid requiring an amplitude sample rate which is an integral multiple of the symbol rate. By the symbol rate is meant the number of bits per second in a serial bit transmission over a single line or circuit. In the above statements and in what follows, it is to be understood that "symbol" as here used signifies an electrical logic level of a single bit of a binary serial data signal such as might be produced by perfect demodulation of a frequency-shift keyed signal of a standard kind.

In order to reproduce a symbol, a predetermined number of successive amplitude samples at a rate which is an integral multiple of the symbol clock rate is selected from the received signal as a first step of identifying a symbol and then the resulting digitized amplitude signal is intermediately stored. Particular amplitudes of particular sequences of amplitudes (i.e. not all amplitudes of all sequences) form patterns which can be evaluated. These patterns are essentially compared with a number of signal patterns fixedly stored in a memory. Since a serial binary data stream has only two logic levels and rapid transitions, it is sufficient to store a moderate number of patterns, for example 8, and many of the bits of the digitized amplitude pattern can be used to determine the degree of deviation of the amplitude pattern from the stored pattern from which it deviates least. A recognition of a transition can be used to produce a synchronization pulse. A repetition of this procedure at half the symbol rate makes possible an output, from the second memory, clocked at the synchronized transition phase (clocked instants), which is a reliable serial binary read-out.

What is referred to above as essentially a comparison is advantageously performed in a look-up table with a data output, auxiliary quality assessment outputs and, in the first look-up, a synchronization output.

The invention provides a simple digitally operating method and system that can be implemented mostly by monolitline integrated circuits and involves no complicated computations, microprocessors or extensive software for the simultaneous performance of synchronization and demodulation. There is the further advantage that simultaneous synchronization and demodulation is made possible.

The basic principle of the demodulation and synchronization method of the invention is the recognition of patterns and the derivation, from pattern recognition, of an identification of the received symbols, while simultaneously obtaining synchronizing pulses which serve to control an oscillator which delivers the reference clock pulses for the entire circuit.

In the processing method, the amplitude quantizing of the imperfectly demodulated base-band signal is obtained after stiff limiting and linear FM demodulation. This amplitude quantization takes place at regular time intervals at a rate which is an integral multiple of the rate of symbol transmission.

The method of the invention is particularly applicable in demodulation methods in which two or more steps of demodulating angular modulation (phase or frequency modulation) are performed at constant amplitude. In such a case the method is not coherent in the classical sense, but consequently limiting can be used which is relatively hard, so that no automatic gain control is needed and, as a result, a remarkable insensitivity to frequency and phase errors is obtained.

The CPM method of demodulation is of significance in this connection and particularly its versions known as CP-BFSK (2RC) and CP 4FSK(2RC). The use of the method in the case of partial response methods of processing is likewise possible, for example in the form of CP-BFSK (4RC). The basic procedure is always the same, and will be described more precisely and in detail further below with reference to the annexed drawings. That example involves CP-BFSK (2RC) modulation. The acronym FSK signifies frequency shift keying.

The synchronization of the symbol clock rate $f_s$ can be thus derived from the symbol flanks. The following equation $$|S_{(t+T_S)} - S_{(t)}| \geq S_o/2$$

where $$|S_{(t+T_S)} - S_{(t)}| = \max.$$

defines the middle of the flank wherein $T_S$ is the duration of a symbol and $S_{(t)}$ is the time-dependent amplitude. The clock pulses for the flank middle are obtained by a phase locked loop (PLL) circuit, which compares the clock pulse sequence with the pulse sequence obtained by a voltage-controlled crystal oscillator and thereby regulates the crystal oscillator so that it keeps in step. The long-time average value $f_{vxco} = f_s$ is thereby generated and maintained. The PLL circuit contains a gate for deleting the reference pulses if no flank pulse is generated, as happens when no information change takes place. Thus only 0-1- and 1-0-transitions have any influence on synchronizing the demodulation result.

Phase jumps can be compensated out by a digital auxilliary loop that is readily implemented as a counter. If the expected pulse repeatedly fails to appear in the expectation window, then by means of this auxiliary loop, having a wider expectation window, a rapid transition in one or several steps can be undertaken to reach the new time position. The setting of the window size and the correction step width is critical and can usefully be confirmed or determined experimentally for the particular frequencies and pulse rates of a particular case. The object in every case is to obtain and maintain synchronization with the smallest possible signal-to-noise power ratio.

Demodulation is performed, in contrast with conventional methods of demodulation of digital signals, by pattern recognition. In order to be able still to demodulate when the signal-to-noise ratio goes to the smallest possible useful signal-to-noise ratio, the method proceeds on the basis of a received signal curve segment which comes nearest to an identifiable one of the expected pattern curves that are stored in memory. The magnitude of the deviation can be utilized as a quality assessment and, moreover, irregular conditions resulting from disturbances in the transmission path can also be recognized in this fashion. The successful decoding of disturbed signals can also be supported by the insertion of known error recognition codes.

A preferred embodiment of the method involves temporarily storing of the clocked-out pattern in step with the symbol clocking so as to facilitate centering on the middle of a symbol, over a symbol length $T_s$, and then comparing the temporarily stored pattern with the permanently stored pattern curves. The pattern that is sought is then the one which has, for example, the smallest difference from the received pattern in terms of the least squares criterion (least sum of the squared differences). For this purpose it is important, however, in the case of higher value modulation kinds or by sampling over more than one symbol duration, that a large number of comparisons are necessary, which also require rapidly acting hardware for high transmission rates.

Another preferred embodiment makes available the possibility that certain recognitions can be extracted from the time course of received signals, from which the symbol content can be calculated. Such methods are, in part, very computation-intensive and depend upon complicated and extensive algorithms, the processing of which at higher transmission speeds would require high capacity hardware which usually is available only at great cost.

A further method has been found particularly advantageous which makes use of a memory for demodulation. A few digitized amplitude values of the received signal serve in this case as addresses for a memory in which are stored simply as the result which would be obtained in the corresponding determination by quasi-symmetric considerations or by means of a suitable algorithm, so that even self-learning systems can profit from the method. By suitable address assortments the memory content can be directly made to correspond with the pattern. In other words, when a particular deviation from a pattern is frequent, that can become a new stored pattern.

The bringing in of more than three time intervals per symbol (that is, symbol start symbol middle and symbol end) has the result, due to the base-band filtering, that here a series of 2RC pulses proceed at a frequency $\frac{1}{2} \cdot f_s$, producing again no noticeable additional improvement, because the rate of change of a predetermined inherent signal value cannot be exceeded.

BRIEF DESCRIPTION OF THE DRAWINGS

The invention is further described by way of illustrative example with reference to the annexed drawings, in which:

FIG. 1 is a circuit block diagram of an evaluation circuit for an embodiment of the method of the invention;

DESCRIPTION OF AN ILLUSTRATED EMBODIMENT AND METHOD

Figure 2A:
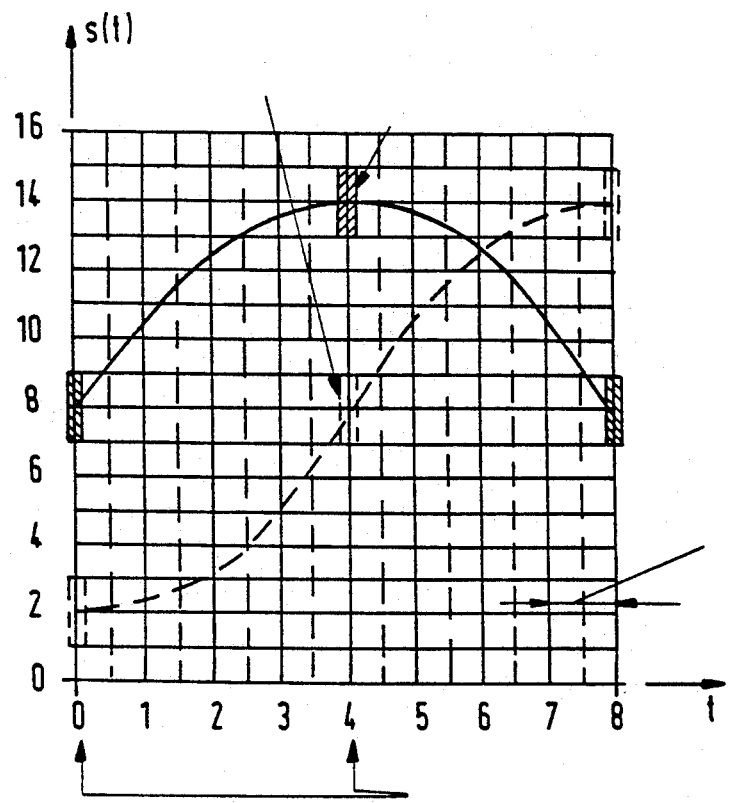
FIG. 2a shows the course of an undistored signal for one symbol period for two significant phase positions, both ideally (solid line) and practice (broken line)

The circuit block diagram of FIG. 1 shows an illustrative example of a signal evaluation circuit for carrying out the method of the invention. A base-band signal which appears at an input connection 1 is supplied to a low-pass filter 2 and is there freed of disturbing harmonic components. The output of the low-pass filter 2 is connected with an input of an analog-to-digital (A/D) converter 3, which quantizes the base-band signal with, for example, a width of 4 bits. This digitizing preferably takes place with clocking by an 8-fold or 16-fold multiple of the symbol clock rate, which means that every "symbol" (as above defined) is sampled 8 times or 16 times at equidistant time intervals. In that way each symbol is converted into 8 or 16 digital words of 4-bit length. The clock pulses for this sampling are produced by a clock pulse generator 4, the output signal of which is also supplied to the clock input of a first word shift register 5, which, at its data input receives the sequence of 4-bit words produced by the A/D converter 3.

The word-shift register 5, for the eightfold sample rate, holds 9 words, each of 4 bits, ready after every shift for addressing a first read-only memory (ROM) 6. For twice that sample rate there would be 17 words in the register 5. This ROM 6 is a look-up table that can be regarded as providing a first pattern comparison which provides for evaluation of the quality of coarse demodulation and synchronization. FIG. 2a shows the course of an undistorted signal for one symbol period for two significant phase positions, both ideally (solid line) and in practice (broken line).

The signal of the clock signal generator 4 has a clock rate that is high enough for obtaining a sufficiently fine time grid for enabling the synchronization of signals in the digital processing. If for example, for obtaining sufficiently accurate synchronization, the 16-fold symbol sampling is selected, the first word-shift register 5 needs to be provided with greater length. Since only the symbol beginning, symbol middle and symbol end need to be provided as output from the register 5, however, a 12-bit address space is sufficient for the ROM 6 in either case.

With a ROM having a capacity of 32 kilobytes there can be made available at the output of the ROM 6, a synchronizing pulse, a disturbance flag bit, 3 bits signifying the signal quality and 3 bits for signifying the information content for each decoded segment of curve of the particular signal segment, thus for example "010".

A second word shift register 8 follows the first ROM 6 and has its data input connected to the data output of the ROM 6. In other words, the output connections on which the information of the decoded curve segment appear are connected to the data input of the second word shift register 8. The reading out of the first ROM 6 and the clocking of the second shift register 8 take place at twice the symbol clock rate, that is, with the sampling clock rate of the clock pulse generator 4 divided by 4. This reduced clock rate, designated $2f_{symb}$ in FIG. 1 is made available at a clock input 7 shown in FIG. 1, The synchronizing pulses (midsymbol flank) proceed as output pulses of the ROM 6 and reach the clock pulse generator 4 through a phase-locked loop (PLL) 15. The pulse generator drifts slightly in phase and frequency in the absence of these synchronization pulses until the words 0, 5 and 9 (or 0, 9 and 17) show one of the profiles of FIG. 2a (either could be used, depending on the selected look-up table content).

The information contents of the memory produce a word sequence in the second word-shift register 8. This word sequence serves to address a second ROM 9 which follows the shift register 8 in the digital processing steps of the method of the invention.

Figure 8:
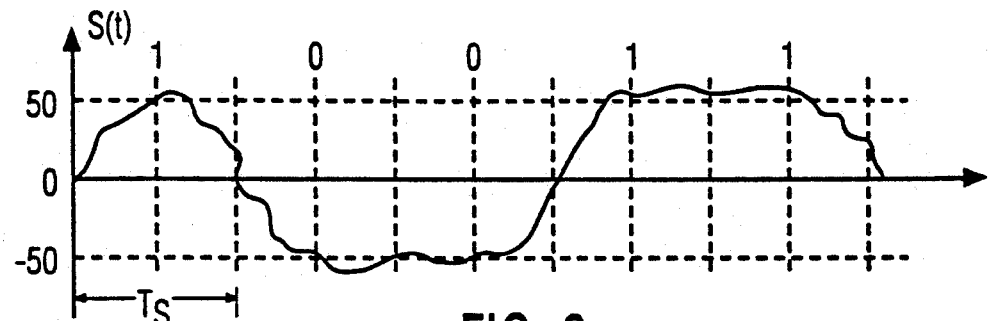
FIG. 8 is a curve showing the shape of a distorted base-band signal $U_B$.

The memory 6 is clocked at twice the symbol rate. The word sequence contained in the shift register 8, of for example 5 words each of 3 bits, corresponds to 5 successive curve elements and represents the decoded symbols of the information content of two successive symbol words into the shift register 8). The corresponding signal relations are schematically shown in FIG. 2b, which shows how, ideally, five successive values can define two successive symbols. FIG. 8 shows the corresponding non-ideal situation.

An average value is performed by the addressing of the ROM 9, in a which curve segment, like that of FIG. 2b for example, may represent the sequence MFMFM in symbolizing representation, where "F" signifies the midpoint of a flank and "M" signifies the middle of a symbol. The formation of an average from the information content of two symbols of the input signal takes place in the second ROM 9. In the case of FIG. 2b the average of 0, 0 and 1 confirms the value 0 for the middle word of the five word sequences. The second ROM 9 in the case requires an address space of $2^{15}$. It produces not only the decoded information but also a transmitted quality criterion. In consequence a memory capacity of 16 kilobytes is necessary.

At an output 10 of the second ROM 9 there appears the averaged decoded information for each successive symbol. At one input 11 a clock signal $f_{symb}$ is applied. A further 3-bit word, corresponding to the content of the same addressed memory location, forms at the output 14 of the second ROM 9 an averaged quality assessment, which is a measure of the reliability of the signal appearing at the output 10.

If in the averaging only the symbol midpoints are used, the dimension of the second memory 9 is greatly reduced, in the present example to 0.25 kilobyte.

If the averaging is to take place directly with the quantizing of amplitude values, the circuit needs to be correspondingly extended.

It is important in the operation of the demodulation and synchronization method of the invention that the recognition of patterns and the significance derived therefrom for the received symbols as well as the obtaining of synchronizing pulses serve especially for controlling the oscillator 4 which delivers the reference clock pulses for the entire circuit.

For the processing that then follows, the amplitude quantization of the base-band signal obtained after hard limiting and linear FM demodulation is important. The amplitude quantization is carried out at regularly spaced instants which appear at a rate which is an integral multiple of the symbol rate. The amplitudes are preferably clocked by the 8-bit analog-to-digital converter 3 with $2^n$ times the symbol clock rate, where preferably $n=3$ or 4, which is to say $2^n=8$ or 16.

In FIGS. 2a and 2b, as already mentioned, details of the evaluation are shown in a schematic representation. In FIG. 2a, the sampling instants in a symbol period are shown for synchronization and coarse demodulation by narrow shaded areas. The sampling instants for synchronization are at the symbol beginning, the middle of the symbol and the symbol end. The signal shown in solid lines shows the symbol, while the signal flank represented by the broken line shows a transition between symbol values.

Figure 2C:
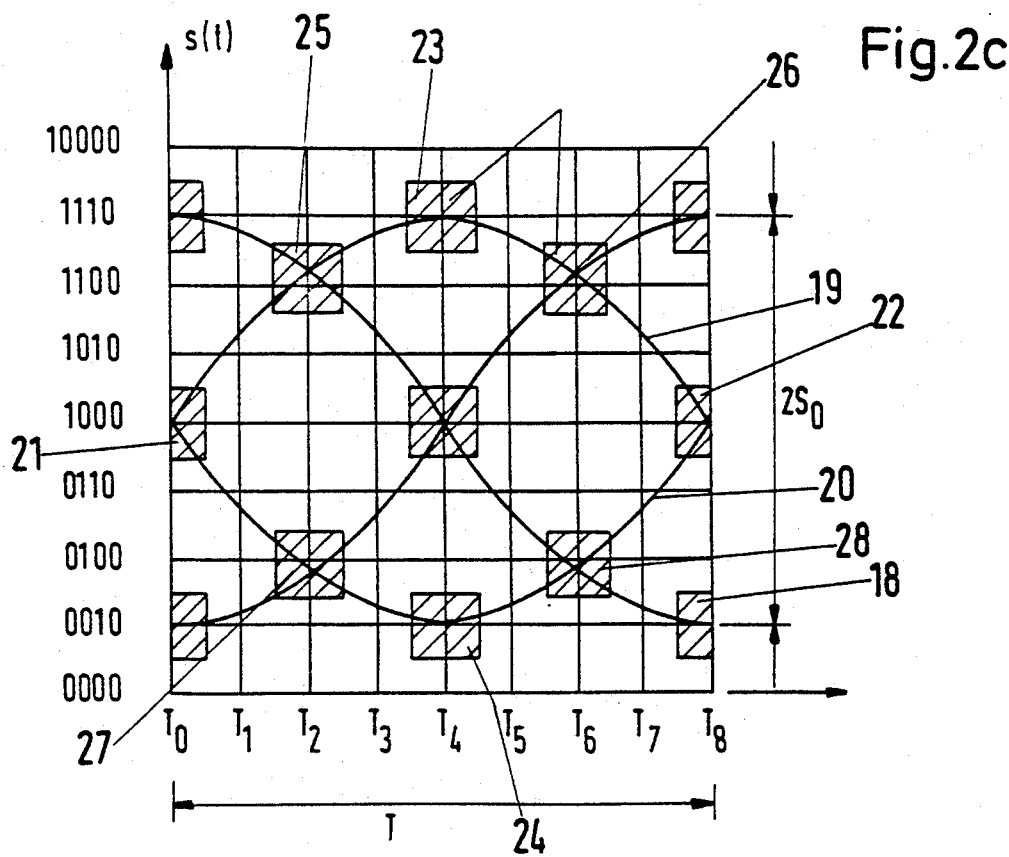
FIG. 2c is a graphical representation of evaluation in a case of CP-BFSK(2RC) modulation.
Figure 2B:
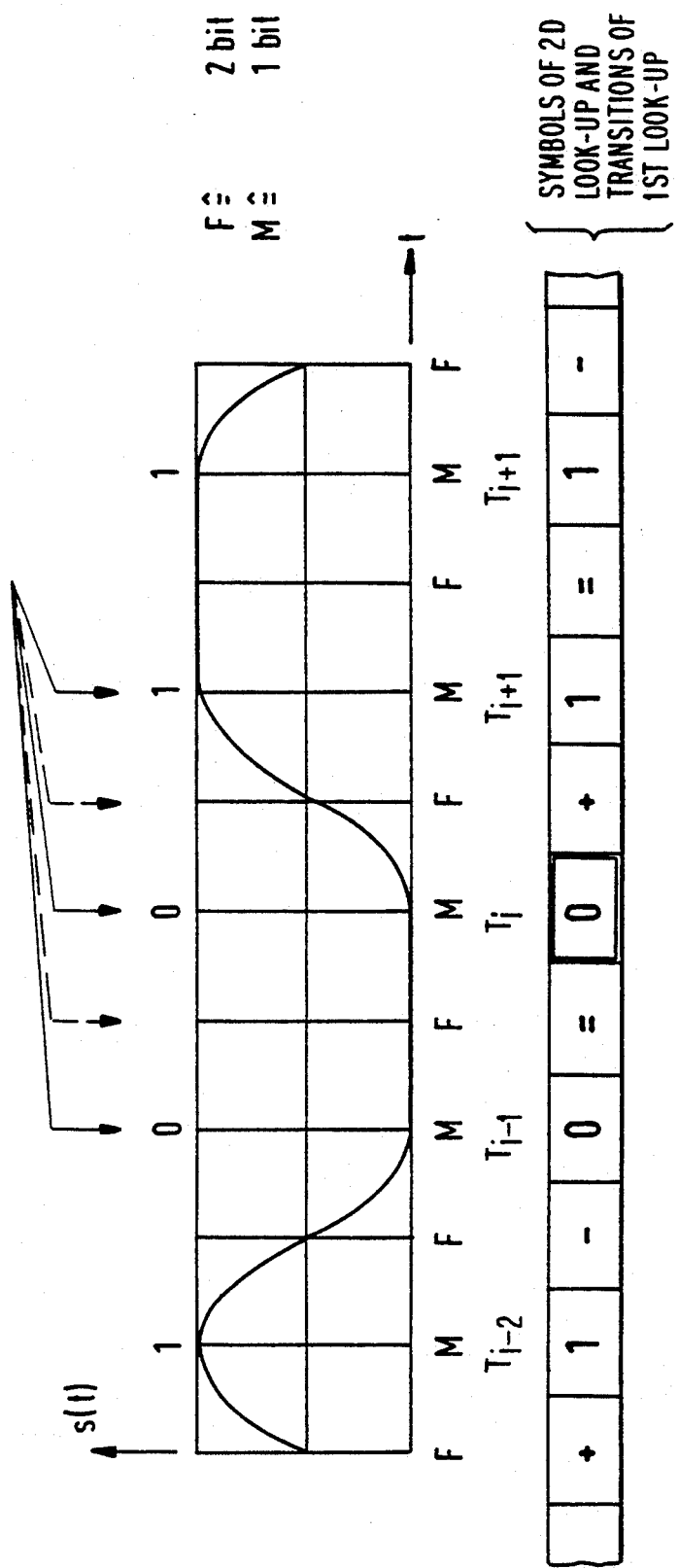
FIG. 2b is a graphical representation of the operation performed by means of the second ROM 9 of FIG. 1.

In FIG. 2c the relations that prevail in a CP-BFSK (2RC) evaluation are schematically shown. The symbol T to be evaluated is obtained by means of the shaded areas within respective evaluation windows 18 and 21-25 limited in time and amplitude, which are provided on a time grid corresponding to the expected times of arrival of the symbols. For a curve which corresponds to a positive or negative half-wave 19 or 20, there are respectively provided, at the beginning and at the end of the "window", evaluation fields 21 and 22. At the null transitions correspondingly, evaluation fields 23 and 24 are located in the respective regions of the positive and negative extremes in the middle of the evaluation window. Further evaluation fields 25 to 28 are provided in timewise and amplitude-wise intermediate regions.

Figure 3:
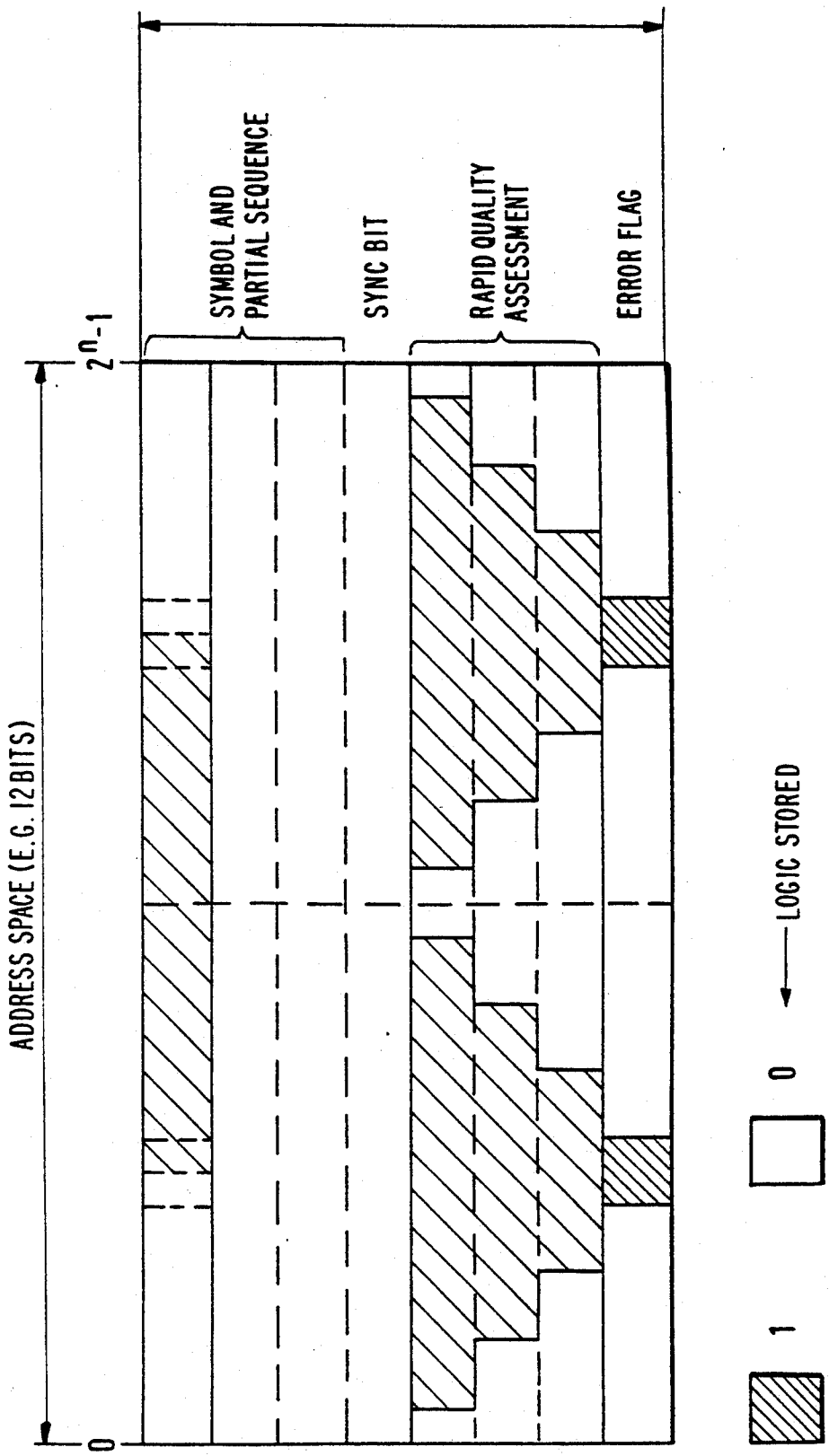
FIG. 3 is a schematic diagram showing the relation between received pattern and memory content in an embodiment of demodulation by envelope curve methods.

FIG. 3 schematically shows the pattern relation to the memory addresses. An addressed space from $2^{16}$ to $2^{20}$ appears to be suitable as the upper limit for the memory area of a practical system embodiment and should not be exceeded, for economy of implementation.

The principle on which the invention is founded is capable of wide and effective application mainly because in the final analysis it depends on a kind of associative memory.

If the symbol beginning, the middle of the symbol and the symbol end are quantized, as illustrated in FIG. 3, k bits at a time, then, if k=4, there results the need for an address space of $2^{12}$. The ROM can then provide an output of the symbol significance, for example "0 1 0", and also a disturbance signal 1 or 0 and a quality assessment of k-1 bits, in the illustrated case 3 bits. The complete resulting word accordingly contains 6 bits (cf. FIG. 3). For a CP-BFSK (2RC), a ROM with a capacity of 34 kilobytes should be sufficient. If the system is clocked with a rate which is 8 times the symbol rate and obtains samples that are equidistant in time, it is then possible to derive bit rate pulses. They are set on the flank middles in the memory and appear exactly when the middle of a 0-1 or of a 1-0 transition is reached, when $|S_{(t+)} - S_{(t)}| \geq S_0/2$ is at a maximum. If however there is no change of information, there are then no flanks usable for synchronization and, consequently, also no flank pulses. It is sufficient for synchronizing through a PLL circuit to have occasional synchronizing pulses while information is being transmitted in a serial data stream. The pattern memory can thus serve simultaneously for demodulation and obtaining synchronization.

In order to improve the freedom from disturbances, sampling over several symbol periods is also possible. With two or more symbol periods 5 sample periods preferably provide the value, as shown for example in FIG. 2b. With sampling by data words of four bits an address space requirement of $2^{20}$ results. It is possible thereby to decode also a longer portion of a symbol sequence, as for example the symbol sequence "001". If there is connected therewith also a signal bit dependent upon a disturbance threshold, the synchronization bit and three signal quality signifying bits, a signal sequence of 8 bits results. The resulting memory requirement then reaches 1 megabyte.

Figure 4:
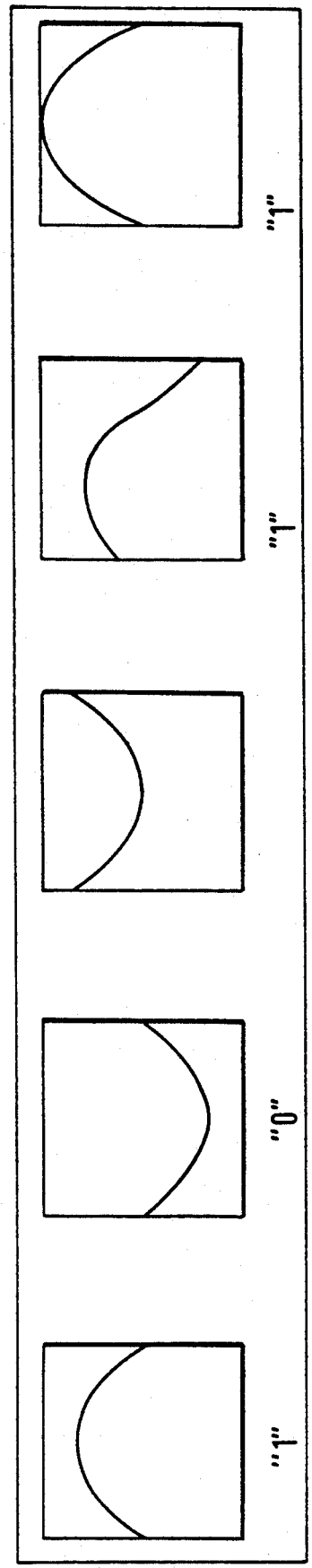
FIG. 4 shows a collection of diagrams representing undisturbed and disturbed symbols.

The method of the invention is particularly useful if instead of an amplitude an average value normalization, deviations from the mid-position is taken account in decoding. In FIG. 4 a few significant example for the evaluation of distorted symbols in the cases of amplitude errors, offset errors, signal distortion and the like are represented. In these cases the signal shape is automatically ordered on the basis of the significance of the overall pictorial appearance in the pattern recognition operation that is performed. As a result the signal shape is more precisely evaluated and in the case of a simple threshold comparison with fixed thresholds, since the entirety of the information that is available is more effectively used.

Figure 5:
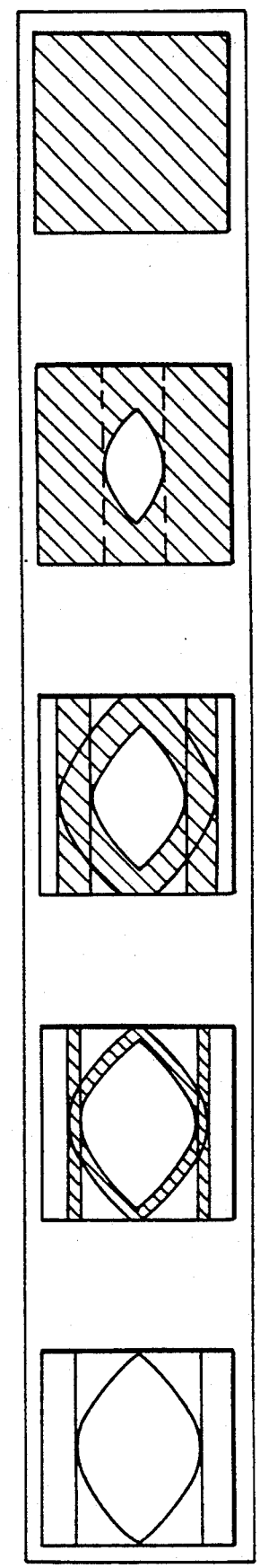
FIG. 5 is a collection of diagrams of signals of respectively different quality, the representation being of the so-called eye-pattern kind.

The effect of noise or other disturbances is qualitatively shown in FIG. 5. It is there made evident how a quality assessment can be provided from the signal position and its shape. In the provision of this quality assessment it is preferred to use the results in the decoding of more than one symbol, as already mentioned.

In signal transmission utilizing certain error correcting codes an assessment is useful which deals with the reliability of the decision obtained for each individual symbol. This can be brought into the operation with the following avoidance of residual errors. For this purpose it is particularly useful to have a preliminary or "rapid" assessment for every single symbol. It is of particular significance that the evaluation of the shape is independent of its position. In such a case the effects of superimposed low frequency disturbances vanish and likewise variable offsets, etc., or at least these are substantially reduced in their effects. This effect is based on the fact that in the last analysis no absolute values are produced with reference to thresholds, but instead signal differences are evaluated which are either very little impaired or not impaired at all by the disturbances that are present.

Figure 6:
FIG. 6 is a graphical representation illustrating the obtaining of the signal content of a symbol in a manner taking account of the neighboring symbols.

The formation of averages can make use of the fact that during the duration of a symbol various information can be obtained, e.g. "0" and the probable partial sequence "001". FIG. 6 shows an example of how the evaluation is carried out, in this case referring to the curves in FIG. 2b.

Figure 7:
FIG. 7 is a diagram like FIG. 6 representing the retrieval of symbols by means of least-square evaluation of the amplitudes with respect to the nearest stored patterns.

The utilization of this method can be particularly well appreciated if the starting point of consideration is that few partial decisions (decisions on criteria that contribute to the ultimate result) are false and that the majority of such decisions are never-the-less correct. In averaging therefore, the influence of the correct decisions are preponderant and the probability of false demodulation of a particular symbol is reduced. A further improvement is attainable if instead of the demodulated logical values the quantized signal values are directly utilized for this averaging, as is indicated in FIG. 7, since then a more precise evaluation of the originally present information is possible. In FIG. 2b, for this reason, along with the ideal signal curve shown by a solid line an example of a real signal curve is shown in a broken line. It is also conceivable to enter the sequence as quantized values but to designate the symbol only as a normalized value "1" or "0", in order to influence the weighting. Practical experiments are necessary in this case for optimization. The same holds for sampling over more than 1 symbol. Averaging is tolerant of errors, so that isolated false information can be covered-up, but nevertheless even here the signal quality can be assessed by values between "$\frac{1}{2}$" and "1" or between "0" and "$\frac{1}{2}$". In the foregoing statement "$\frac{1}{2}$" means the amplitude values relating to the exact middle between the two logical states.

According to the same principle as described above, the formation of averages can be carried out by means of a read-only memory. The address space is the number of interrelated symbols multiplied by the number of quantization bits per symbol. In the above example there are 3×4 bits, hence an address space of $2^{12}$. The symbol middle is in this case more strongly emphasized. It is possible, however, also to consider only the symbol and the neighboring flanks and thereby to obtain for example from the flank 01 the symbol "1" and from the neighboring flanks 0-1 and 1-0 the word "01110". For that reason the symbol under consideration can be assigned the significance "1". Here also processing is better done with the quantized amplitudes instead of the logic designations.

Synchronization and demodulation on the basis of pattern recognition is obtained essentially by two memories connected to follow each other, which can be implemented in a single integrated circuit.

FIG. 6 shows an example of how the evaluation can be performed by the already mentioned consideration of the fact that a number of data can be obtained regarding one symbol, for example the symbol "1" and a likely partial sequence "010".

FIG. 7 is like FIG. 6 but shows the use for averaging, of decisions individually expressed in terms of 1 and 0.

FIGS. 6 and 7 relate to the data of FIG. 2b, which in turn relates to the final look-up table stage, in which only the sampling instants $T_i$ shown in solid arrows in FIG. 2b are involved. The broken-line arrows relate to the first look-up table which is operated at twice the symbol rate. Furthermore, FIGS. 6 and 7 show three successive operations at the symbol rate, each having the benefit of a preceding sample and a succeeding sample.

In FIG. 6, for example, the first sample effect is shown in the first two rows of the diagram of FIG. 6, the upper row simply showing the evaluation 0 at time $T_{i-1}$. The second row relates to the results at the same sampling time which also show the most probable preceding and succeeding symbols. This line therefore shows the probable sequence 001. The next two lines relate to the results at time $T_i$, which show the symbol 0 on the first line and the sequence 010 on the second line. The following two lines for the operation at time $T_{i+1}$ show the symbol 0 on the first line and the sequence 100 on the second line. The bottom line shows that the value 0 for the time $T_i$ is validated by all three samples here considered.

FIG. 7 shows the same sequences, but with averages between 0 and 1 replacing each 0 and 1. In this case all the entries in the column $T_i$ are 0.1, so that a highly probable 0 is confirmed at the bottom line.

As already mentioned, FIG. 8 illustrates an expectable kind of signal with considerable distortion for comparison with the simpler signal of FIG. 2b.

The selection of the contents of the first ROM 6 can result from quasi-geometric considerations, as has already been indicated. Accordingly the first ROM 6 stores a basis for obtaining a majority among decisions. For example, the sequence "+", "1", "−" (where "+" and "−" here respectively represents rising and falling flanks) provides a clear indication for a received "1" which is to be found with the highest probability between 2 zeros. If then, together with other similar considerations, a more than 50% probability for the "1" is found, a corresponding symbol is confirmed as "1" and the same applies for the "0" state when the ROM 6 has thus indicated.

The first ROM 6, however, needs to be of greater capacity when the averaging is to take place directly with the digitized signal values supplied to it. The first ROM 6 must for this purpose first have converted the quantized amplitude signal values into a likewise quantized preliminary result and not into only the logic values 1 or 0.

The quality assessment information can then be utilized in a two-fold way. On one hand it can be used for assessing in the first ROM 6, the average signal quality. On the other hand it can be used, also in the first ROM 6, in the decoding of the information, in so far as an error correcting code is used which can usefully evaluate this information by use of a few code families that have heretofore been constructed for such a purpose.

In an extension of the method and system of the invention of modulation that has several modulation stages, as for example CP-4FSK (2RC), quantization in a larger number of quantization levels is provided, so that the address space of pattern memory must be correspondingly greater. In partial response methods, evaluations each over two symbols are used in a manner quite analagous to the principle described above.

Figure 9:
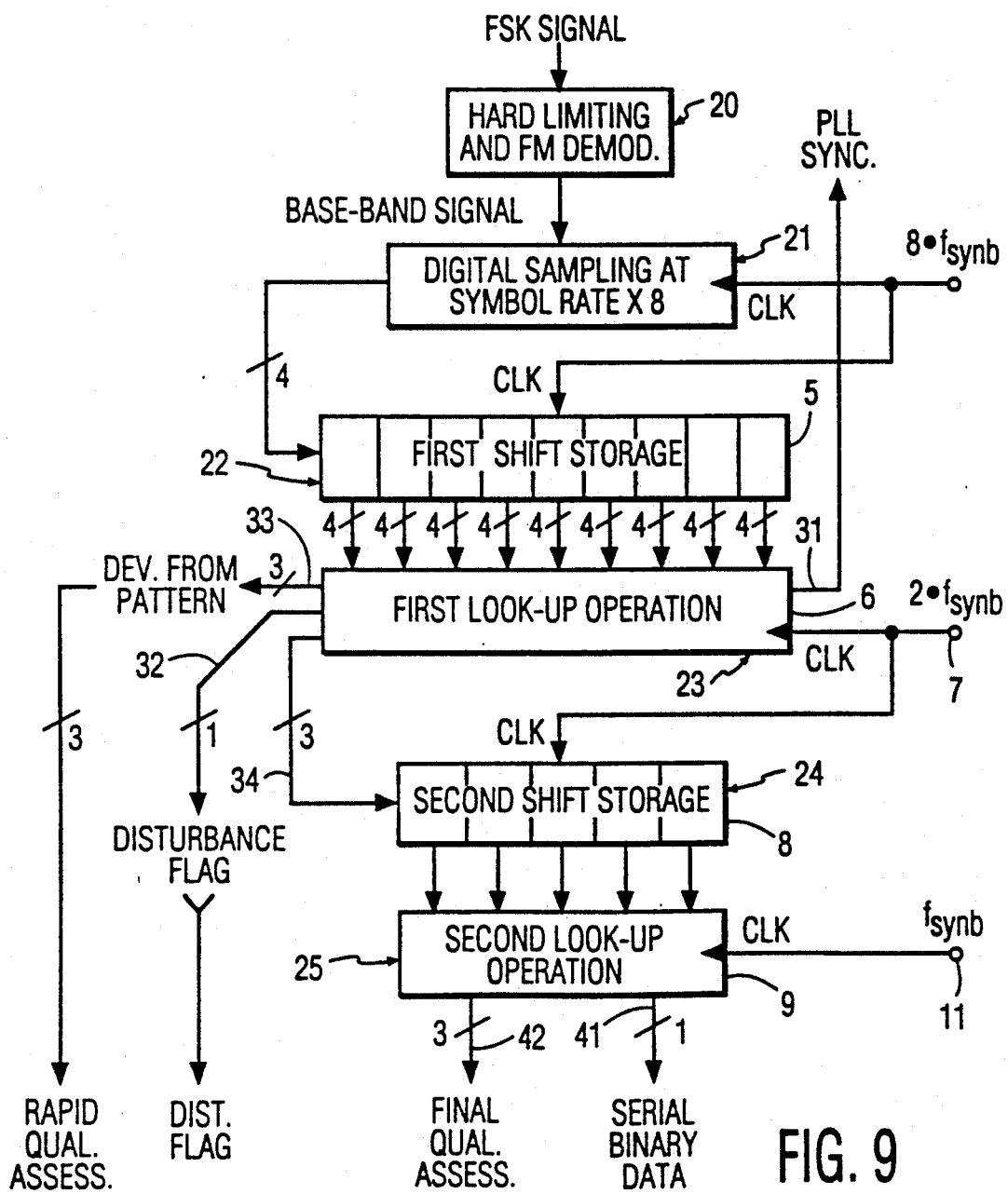
FIG. 9 is a flow chart of the method of processing that is performed in the system of FIG. 1, which may also be regarded as a different representation of the system of FIG. 1.

FIG. 9 is a flow chart of the method of the invention which may be regarded as a supplementary showing of the system of FIG. 1.

The first step of the method is FM demodulation of a FSK signal, shown in the block 20. In the practice of the invention, it is important that the limiting be extremely stiff, which means that after every null crossing of the FM signal, until the next signal crossing in the opposite direction, there should be as little variation of amplitude as economically possible. At the output produced by the first step is a base-band signal which, when not disturbed or distorted looks something like the broken-line curve shown in FIG. 2b. In FIG. 2b, the vertical lines crossing the curve are at twice the symbol rate and the curve could be distorted, as for example in FIG. 8 or as shown in FIG. 4 for different degrees and kinds of distortion. For this reason the next step, designated 21 in FIG. 9, is digital sampling of the base-band signal at, for example, 8 times the symbol rate and delivering the samples to the input of a first shift register. This is the first shift storage step designated 22 in FIG. 9. In the illustrated case 4-bit samples are put entered at one end of the shift storage unit 5 which has 9 cells. In the illustrated case, the 4-bit samples of the amplitude of the base-band signal appear at 8 times the symbol rate, so that at any one time in the first shift storage step there are samples corresponding to 1 and ⅛ symbol intervals, and of course that means that for every four shifts a cell that formerly corresponded to a maximum or minimum amplitude of an undisturbed symbol would correspond to a null transition amplitude of an undistorted symbol.

The next step, shown in the block 23 of FIG. 9, is in principle a first comparison with what may be called a set of reference patterns. Only the contents of three cells at the ends and middle of a symbol period are used for comparison, a total of 12 bits. As already explained, this step is in practice performed by using a look-up table in which the eight possible 3-bit output patterns are each stored at a multiplicity of addresses with additional bits at those addresses for describing how far from a good match for the stored pattern the 12-bit input represents. Since the first ROM 6 has an address and reading rate of twice the symbol rate, only one of every 4 shifts produces a conversion of the 12 input bits into the several memory outputs in the first comparison step. This is important, because the clock rate of the first ROM 6 is used to control the clock rate generator 4 (FIG. 1) in a phase-locked loop. Thus, the first look-up table operation also serves to select the middle of symbol intervals or flanks of symbol transitions, when they appear in the 12-bit memory input, for the benefit of the phase-locked loop. There is also an output of 3 bits showing the degree of deviation for use as a quality assessment of the selected three-bit data output with an additional bit as a disturbance flag representing an extraordinary deviation.

The quality assessment bits are shown in FIG. 9 as being provided on the line 33, the synchronizing bit on the line 31 and the disturbance flag bit on the line 32. The data output on the line 34 shows the selected pattern in 3 bits every half-symbol period and puts each selected 3-bit pattern into the second shift storage step, in unit 8, this time of only 5 cells, each with a 3-bit content. Again, only three cells, one at each end of the chain and one in the middle, are used to address the second ROM 9 for the step 25. The next step is a second look-up table operation. In the second table stored in ROM 9, for every address corresponding to an input pattern, there is a possibility of providing an output of one bit which represents the completely demodulated FSK signal and a 3-bit assessment of the reliability of the identification of the logic level of that one bit for each symbol interval. The ROM 9 is therefore clocked at the symbol rate $f_{symb}$. In the case of the ROM 9 of FIG. 1, which performs the last principal step of the method, the 5 cells each producing 3-bit inputs, and likewise the 3 cells which address the ROM 9 span two adjacent symbol intervals, including a cell at each end of the sequence. This is very important, because of the advantages already described of considering two symbol periods for identifying each symbol. This can be combined with some averaging as already mentioned.

The invention is not limited in its application to the above-mentioned preferred embodiment or to its application to mobile radio communication. There are rather a number of likely modifications and variations which make use of the solution of the problem above described even in basically different kinds of embodiments utilizing the method of the invention.

We claim:

1. An electronic signal processing method for demodulation and synchronization of signals digitally modulated by angular modulation of a carrier wave comprising the steps of:

amplitude-limiting said digitally modulated signal and thereby producing an amplitude-limited digitally modulated signal;

demodulating sad amplitude-limited digitally modulated signal and thereby producing a base-band signal having variations in amplitude and containing digital information having a known predetermined symbol rate;

digitally sampling said base-band signal at a sampling rate which is an integral multiple of said symbol rate to produce a sequence of digital amplitude samples and storing said samples in a first chain memory for a first predetermined odd fixed number of successive samples, said predetermined number being large enough to include a sample at each end of a symbol interval defined by said symbol rate;

using middle and end samples of selected amplitude sample sequences presented by sad first chain memory to interrogate a first read-only memory (ROM) look-up table in which a set of reference pattern signals are stored, each at enough addresses for providing output information of the degree of resemblance of an input to said first ROM look-up table to an input most corresponding to said stored reference amplitude pattern which said input to said first ROM look-up table most resembles;

reading out pattern signals from said first ROM look-up table at twice said symbol rate, together with information of said degree of resemblance, also an error bit for detecting a minimal resemblance of an amplitude sample sequence to a stored pattern and a synchronization bit corresponding to a reference amplitude sample value and its position in said sequence;

regulating the phase of said symbol rate and its said integral multiples by means of a loop circuit to which said synchronization bit is supplied when it appears in an output of said first ROM look-up table;

storing said pattern signals read out from said first look-up table in a second chain memory for a second predetermined odd fixed number of successive pattern signals, for the duration of half a symbol period, said second predetermined odd fixed number being smaller than said first predetermined number;

using middle and end pattern signals of selected sequences of stored pattern signals presented by said second chain memory to interrogate at said symbol rate a second ROM look-up table which has enough addresses to produce, in addition to a symbol-identifying binary signal output, also information bits regarding the degree of reliability of said symbol-identifying binary signal output; and reading out from second ROM look-up table said symbol-identifying binary signal output and said information bits regarding reliability of said binary signal output.

2. The method of claim 1 wherein said sampling rate for digitally sampling said base-band signal is equal to said symbol rate multiplied by $2^n$, $n$ being a positive integer greater than 2 and less than 5.

3. The method of claim 1 wherein the limiting of said digitally modulated signal is hard limiting, in order to prevent variations of limiting effect from affecting said base-band signal.

4. The method of claim 1, wherein said reference amplitude to which said synchronization bit corresponds, in the reading out of said first ROM look-up table, is the amplitude of substantially the middle of an intersymbol flank.

5. The method of claim 1, wherein said first predetermined odd fixed number is at least 9 and wherein said second predetermined odd fixed number is not less than 5, whereby information which is addressed to said second ROM look-up table spans at least two entire successive symbol intervals.

6. The method of claim 5, wherein said second predetermined odd fixed number is sufficient to span at least three and not more than five symbol periods.

7. The method of claim 6, wherein said symbol-identifying binary signal output is the result finding an average value over a plurality of successive interrogations of said second ROM look-up table.

8. The method of claim 5, wherein said symbol-identifying binary signal output is the result finding an average value over a plurality of successive interrogations of said second ROM look-up table.

9. An electronic signal processing method for demodulation and synchronization of received digitally modulated signals, said digitally modulated signals as received having an at least approximately predetermined digital symbol rate and being modulated with respect to a characteristic of a carrier wave selected from the group consisting of carrier phase and carrier frequency, said method comprising the steps of:

limiting and demodulating said digitally modulated signal to produce a base-band digital signal;

sampling digitally the amplitude of said base-band digital signal at an integral multiple of said symbol rate with equal time intervals between the sampling instants of successive samples;

intermediately storing a first predetermined number of said digitally sampled amplitude in a manner making a pattern of amplitude values available as an output;

comparing at least some of said amplitude value patterns with predetermined signal patterns fixedly stored in a read-only memory (ROM) look-up table by interrogating said ROM look-up table;

deriving a synchronizing signal when, in the foregoing comparison step, a particular predetermined amplitude value in a particular intermediate storage location occurs;

phase-controlling the generation of symbol rate clock pulses and pulses of pulse sequences appearing at a frequency which is an integral multiple of said symbol rate in a circuit to which said synchronizing signals is supplied.

10. The method of claim 9 in which said read-only memory (ROM) look-up table is clocked at an integral multiple of said symbol rate, said symbol rate multiple being defined as including a unity multiple and excluding fourth and higher multiples, and thereby providing information designating a particular stored pattern signal which is at least approximately matched by said amplitude pattern.

11. The method of claim 10 in which readout of said ROM look-up table also provides output quantity information referred to said particular stored pattern signal which is at least approximately matched by said amplitude pattern.

12. The method of claim 11, wherein after frequently repeated appearances, during practice of the method of claim 11, of a particular amplitude value pattern deviating from but approximating a stored pattern, said particular deviating pattern is put into said ROM look-up table as a stored pattern.

13. The method of claim 10, wherein the step of intermediately storing is repeated for readouts of patterns designated and at least approximately matched by look-up table inputs, among the readout information of said ROM look-up table defining a first ROM hook-up table, and wherein middle and end contents of intermediately stored information are used to address a second ROM look-up table, the second intermediate storage covering a time interval which is at least twice the symbol period corresponding to said symbol rate and said second ROM look-up table being clocked at the symbol rate and delivering binary symbol values.

14. The method of claim 13 wherein said readout of said second ROM look-up table includes also information regarding the degree of deviation of a readout of said first ROM look-up table from an input for said second ROM look-up table which would maximally correspond to the binary symbol value read out by said second ROM look-up table.

15. The method of claim 10, wherein said predetermined number of said digitally sampled amplitudes which are intermediately stored is an odd number not less than 9 and wherein said amplitude sampling rate is eight times the symbol rate.

16. The method of claim 15, wherein said predetermined number of said digitally sampled amplitudes which are intermediately stored is an odd number not less than 17 and wherein said amplitude sampling rate is sixteen times the symbol rate.

17. The method of claim 10, wherein upon determination of a deviation between a pattern in said ROM look-up table and an amplitude pattern used to address said ROM look-up table which exceeds a predetermined magnitude, an error signal is produced upon readout of said ROM look-up table.

18. The method of claim 17, wherein said error signal replaces other information regarding the degree of deviation of said amplitude pattern from said stored pattern.

19. The method of claim 9 wherein said sampling rate for digitally sampling said base-band signal is equal to said symbol rate multiplied by $2^n$, $n$ being a positive integer greater than 2 and less than 5.

20. The method of claim 9 wherein the limiting of said digitally modulated signal is hard limiting, in order to prevent variations of limiting effect from affecting said base-band signal.

21. The method of claim 9 wherein said particular predetermined amplitude value, the recognition of which provides for the derivation of said synchronizing signal, is a value at least approximately equal to the amplitude corresponding to a central prior of an intersymbol flank.

22. Apparatus for improving the reliability of identification of successive symbols of a binary serial data stream of a known symbol rate represented by a base-band signal which has been FM-demodulated from a high frequency carrier wave, said apparatus comprising:

an analog-to-digital (A/D) converter having an analog signal input connected for receiving said base-band signal, a sample-timing input connected to a source of sampling pulses of a frequency equal to $2^n$ times said symbol rate, $n$ being an integer greater than 2 and less than 5, and a parallel multibit output connected internally of said A/D converter for providing parallel multibit sample outputs representative of the respective magnitudes of said base-band signal at the respective times of presence of successive aforesaid sampling pulses;

a first shift register connected for being clocked at $2^n$ times the symbol rate, having $2^n+1$ register compartments, including an entry compartment, a middle compartment and a last compartment of said $2^n+1$ compartments, each for storing said parallel multibit output of said A/D converter, having a multibit register-entry input at said entry compartment of said shift register which is connected to said parallel multibit output of said A/D converter, and having parallel multibit outputs at each of said entry, middle and last compartments;

a first read-only memory (ROM) look-up table having a multibit parallel interrogation input connected for receiving the outputs of said entry, middle and last compartments of said first shift register, a clock input connected to a source of pulses of a frequency equal to twice said symbol rate, a data output for a parallel plurality of bits defining a symbol period signal magnitude reference pattern stored in said first ROM look-up table, a sync pulse output connected internally of said first ROM look-up table for representable by a particular one of said multibit outputs of said first shift register, and a multibit quality information output connected internally of said first ROM look-up table for responding to a particular one of several magnitudes possibly representing deviation of a signal at said interrogation input from a predetermined interrogation signal which would most closely correspond to said reference pattern stored in said first ROM look-up table;

a clock pulse generator for generating symbol rate pulses and pulses of frequencies that are integral multiples of said symbol rate, including pulses for said source of pulses having a frequency equal to $2^n$ times said symbol rate and pulses of said source of pulses of a frequency equal to twice said symbol rate, said clock pulse generator being connected in a phase-locked look (PLL) circuit having a sync pulse input connected to said sync pulse output of said first look-up table;

a second shift register, connected for being clocked at said frequency equal to twice the symbol rate, having $2m+1$ register compartments, m being an integer which is at least 2 and less than 6, said second shift register compartments including an entry compartment, a middle compartment and a last compartment of said $2m+1$ compartments, said second shift register compartments each being connected for storing a parallel plurality of bits from said data output of said first ROM look-up table, and having respective parallel multibit outputs for at least said entry, middle and last compartments, said entry compartment being connected to said data output of said first ROM look-up table; and a second ROM look-up table having a multibit parallel interrogation input connected for receiving said multibit outputs of said compartments of said second shift register, a clock input connected to said clock pulse generator for receiving clock pulses at the symbol rate, a data output connected internally of aid second ROM look-up table for providing a symbol output reliably representative of said binary serial data stream, and multibit quality information output connected internally of said second look-up table for representing deviation at said interrogation input of said second ROM look-up table from a predetermined interrogation signal which would most closely correspond to the contemporary symbol output at said data output of said second ROM look-up table.

23. The apparatus of claim 22 wherein said $2m+1$ register compartments are 5 in number, m being equal to 2, and wherein only said entry compartment, middle compartment and last compartment of said 5 compartments have parallel multibit outputs connected to said multibit parallel interrogation input of said second ROM look-up table.

24. The apparatus of claim 23, wherein said multibit quality information output is connected internally of said first ROM look-up table, for producing a bit, as one of said multibit output bits, representing said deviation which is so great as to indicate the occurrence of a major disturbance.

25. The apparatus of claim 22 wherein said multibit quality information output is connected internally of said second ROM look-up table for producing a bit, as one of said multibit output bits, representing said deviation which is so great as to indicate the occurrence of a major disturbance.

26. The apparatus of claim 22, wherein n=3, and wherein, accordingly, said first shift register is clocked at 8 times the symbol rate an has 9 register compartments.

27. The apparatus of claim 22, wherein n=4, and wherein, accordingly, said first shift register is clocked at 16 times the symbol rate and has 17 register compartments.

* * * * *